United States Patent [19]

Bauer

[11] 3,968,706
[45] July 13, 1976

[54] TWO-SPEED MOTOR CONTROL FOR DUAL HYDROSTATIC TRANSMISSIONS

[75] Inventor: James J. Bauer, Lisbon, N. Dak.

[73] Assignee: Clark Equipment Company, Buchanan, Mich.

[22] Filed: Feb. 6, 1975

[21] Appl. No.: 547,537

Related U.S. Application Data

[62] Division of Ser. No. 400,462, Sept. 24, 1973, Pat. No. 3,938,401.

[52] U.S. Cl. ............................... 74/471 R; 92/12.2
[51] Int. Cl.$^2$ .......................................... G05G 9/00
[58] Field of Search ..................... 74/471 R; 91/505; 92/12.2

[56] References Cited
UNITED STATES PATENTS

| | | | |
|---|---|---|---|
| 2,205,651 | 6/1940 | Hoffman et al. | 74/471 |
| 2,460,693 | 2/1949 | Hall | 74/471 |
| 3,065,700 | 11/1962 | Blenkle | 92/12.2 |
| 3,776,325 | 12/1973 | Jespersen | 74/471 R X |

*Primary Examiner*—Allan D. Herrmann
*Attorney, Agent, or Firm*—Harry G. Thibault

[57] ABSTRACT

A two-speed control for dual hydrostatic motors, especially for self-propelled, skid-steered loaders having hydrostatic transmissions. Each motor has a rotating piston group and a swash plate inclinable in either of two positions of piston displacement for low or high speed output. A shift lever connects the swash plate control arms of the motors with a manual selector lever biased by an over-center spring mechanism to either the high or low speed position. The shift lever has a slide and guide connection with one swash plate control arm and pivotally connects to the other in an arrangement which automatically locks the swash plates in the proper attitude in either shifted position of the slide and guide connection corresponding to the low or high speed range.

Two variable displacement hydrostatic pumps, one associated with each motor, are independently controlled by a pair of control levers operable to vary the pump displacement within both the high and low speed ranges of the motors.

1 Claim, 6 Drawing Figures

TWO-SPEED MOTOR CONTROL FOR DUAL HYDROSTATIC TRANSMISSIONS

This is a division of application Ser. No. 400,462, filed Sept. 24, 1973, Now U.S. Pat. No. 3,938,401.

BACKGROUND OF THE INVENTION

The invention pertains to the art of self-propelled, rigid framed, skid-steered end loaders having dual variable speed hydrostatic transmissions independently controlled for both forward and reverse drive of the loader wheels on opposite sides for propelling and maneuvering the machine.

FIELD OF THE INVENTION

A skid-steered loader of the type referred to above is disclosed in U.S. Pat. No. 3,635,365 issued Jan. 18, 1972 to the assignee of the present invention entitled "Tractor Vehicle with Hydrostatic Drive Means," inventor James J. Bauer. Hydrostatically driven loader vehicles of the type described in the aforementioned patent are characterized by the fact that the wheels on one side may be driven in either forward or reverse direction independently of the wheels on the opposite side so that the vehicle is both propelled and maneuvered without actually turning the wheels relative to the body. Rather by varying the speed and/or direction at which the wheels on one side are driven relative to the wheels on the opposite side the machine is "steered" in a skid-steered fashion characterized by quick turns and high maneuverability. The pairs of wheels on each side are driven by separate transmissions. Each transmission is controlled by a separate lever which through a linkage varies the plane of the swash plate of a variable displacement hydrostatic pump having a rotating piston group driven by the engine. The plane of the pump swash plate determines the displacement of the pistons and thus the speed. By varying the angle of the swash plate in either direction from a neutral mode, a change in direction of the transmission units is obtained to drive the wheels in either a forward or reverse manner.

The hydrostatic pumps supply hydraulic pressure to a pair of hydrostatic motors which have output shafts drivingly connected to gear boxes on either side of the machine supplying power to the wheels. Each of the hydrostatic motors, as with the variable distances, hydrostatic pumps, has a rotating piston group and inclinable swash plate. The motor swash plate will be inclined to its full displacement position when the maximum tractive effort of the machine is required, such as during loading operations when speed requirements are low. At times, however, when the machine is to be moved considerable distance, such as between work sites or over a road, higher speeds are needed. In this case the motor swash plates will be inclined at a reduced piston displacement position to increase the speed. Thus, the operator may select either a high or low speed range and within those ranges, vary the speed of the loader by changing the angle of the pump swash plates to obtain a widely variable range of power versus speed ratios depending upon the operational requirements of the machine.

DESCRIPTION OF THE PRIOR ART

Heretofore it has been the practice to employ a servo mechanism for shifting the hydrostatic motors between the low and high speed ranges. By servo mechanism it is understood that some type of power assisted device is employed for holding the motor swash plates against the force of the pistons attempting to return them to a more reduced displacement position as opposed to a direct mechanical system where the operator must physically hold the angle of the swash plates. In the case of the aforementioned loader the servo mechanism is actuated by twisting a hand grip of one of the steering control levers which actuates a cable connected to a valve. The valve controls an hydraulic cylinder connected to the swash plates of the hydrostatic motors. The operator shifts between either the high or low speed ranges by simply moving the valve spool and the restraining force required for holding the swash plates in the correct position is supplied by the hydraulic cylinder. Also, it has been found that ordinary mechanical linkages do not furnish adequate firm location of the swash plates against the internal forces generated.

SUMMARY OF THE INVENTION

In the present invention a direct mechanical, non-servo type, two-speed hydrostatic motor control is provided. The control includes a shift lever interconnecting the motor swash plate control arms having an elongated body portion pivotally connected at one end to one control arm and being linked at the opposite end to the control arm of the other motor by a guide and slide arrangement. The lever simultaneously shifts the motor swash plates to either of two stop limit positions corresponding to the high or low speed range. The swash plates are held in the shifted positions by a combination of the wedging action of the slide and guide and an overcenter spring mechanism. As a result, a large mechanical force in relation to the spring force is available to prevent drifting or movement of the swash plates under the pressure exerted by the rotating piston groups tending to return them to a reduced displacement position. Enough overtravel is designed into the linkage so that full travel of the swash plates is accomplished without adjustment to compensate for manufacturing tolerances.

DETAILED DESCRIPTION OF PREFERRED EMBODIMENTS OF THE INVENTION

Figure 1:
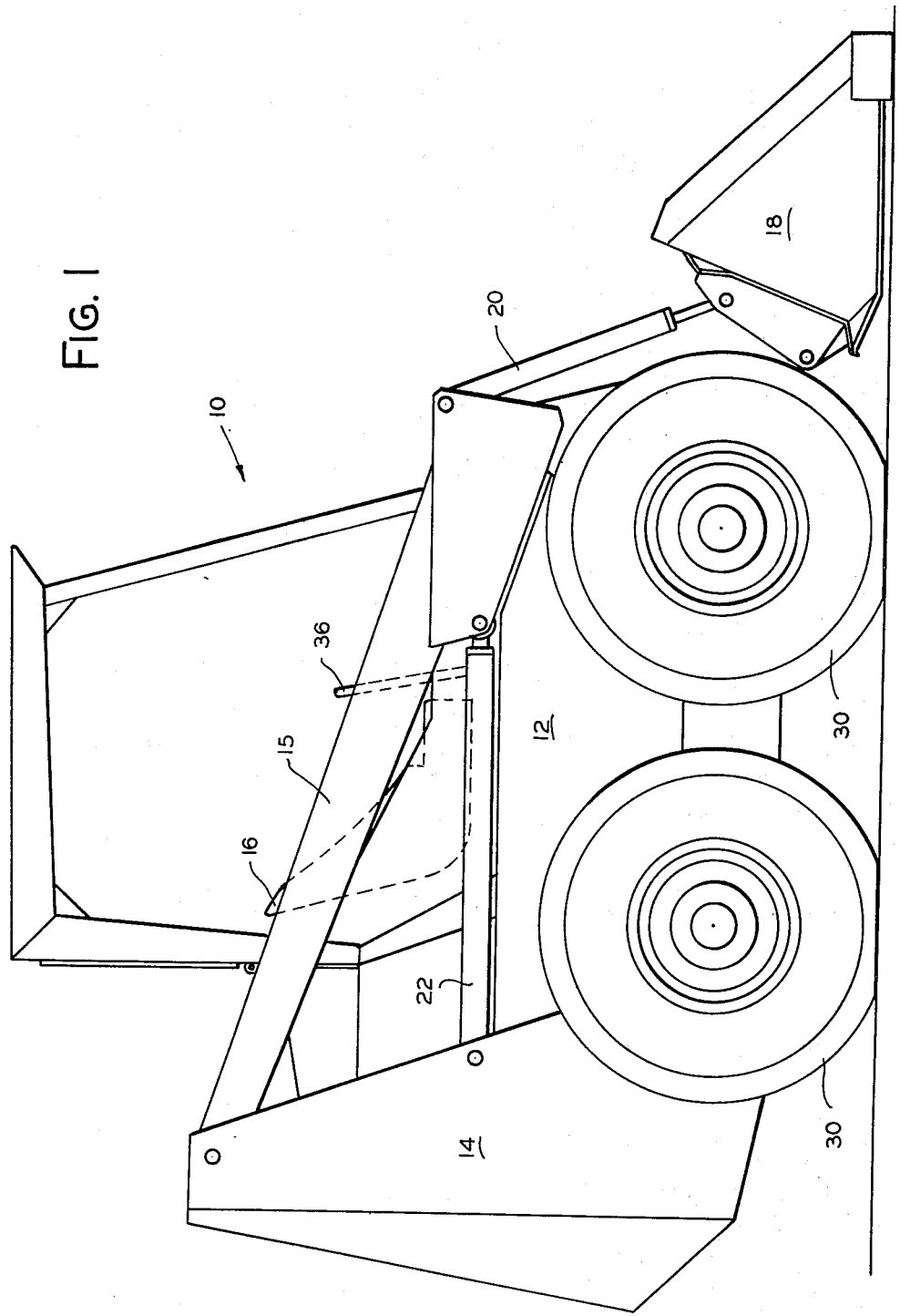
FIG. 1 is a side elevational view of a skid-steered end loader employing a hydrostatic drive of the type using a two-speed motor control according to the present invention.

FIG. 1 shows an end loader vehicle 10. Generally the end loader comprises a body 12 having a pair of uprights or stanchions 14 at the rear. A pair of lift arms 15 are pivotally connected at the upper ends of the stanchions 14 and extend downwardly in the lowered position along either side of the operator's seat 16. A material handling bucket 18 is mounted at the front end of the loader arms 15. Bucket tilt cylinders 20 and lift cylinders 22 are operated by foot pedals (not shown) at the operator's feet controlling a valve bank in a separate hydraulic circuit operating the bucket tilt and lift cylinders 20-22.

A. First Preferred Embodiment

The body 12 includes a transmission compartment (FIG. 2) which is in the lower portion thereof. It contains a pair of gear cases 24, one bolted to each side of the compartment, having output sprockets 26 which, through a chain and sprocket reduction with the wheel sprockets 28, independently drive the loader wheels 30 on opposite sides of the machine. The wheels are mounted on the stub axles 32. The stub axles are driven in either the forward or reverse direction at varying speeds depending on the position of either of two steering control levers 36 (FIG. 1) located on either side of the operator's seat. For a detailed showing of a steering control linkage mechanism by which the operator may vary the speed or change the direction of rotation of the transmissions, to the extent such disclosure is necessary for an understanding of the present invention and is considered as forming a part hereof, reference may be had to U.S. Pat. No. 3,605,519 entitled "Control for Dual Hydrostatic Drive" issued Sept. 20, 1971 to the assignee of the present invention. Reference is made in particular to the portion of the specification in that patent commencing at column 2, line 17–41; line 61–72; and column 3, lines 1–3 and the drawing in FIG. 2. Essentially the description in that patent, which shall be considered as incorporated by reference in this specification to transmissions, extent indicated above, provides for a pair of hydrostatic transmission, each having a variable displacement pump of the rotating piston and inclinable swash plate type. The output of the pumps is delivered to separate hydrostatic motors establishing a closed loop with each pump. The vehicle is steered, pivoted, reversed and accelerated in a rapid or highly maneuverable fashion solely through operation of the steering control levers. Independent movement of the levers independently varies the swash plates of the variable displacement hydrostatic pumps. With both levers full forward, the swash plates are fully displaced in one direction from a neutral mode for maximum forward speed and vice versa for reverse. Or, one lever may be moved to a greater extent than the other for a differential drive producing a skid turn depending on the magnitude of the displacement of the control levers, i.e., a small difference causes a gradual turn while pulling one lever back and pushing the other forward makes the loader pivot in its tracks.

Figure 2:
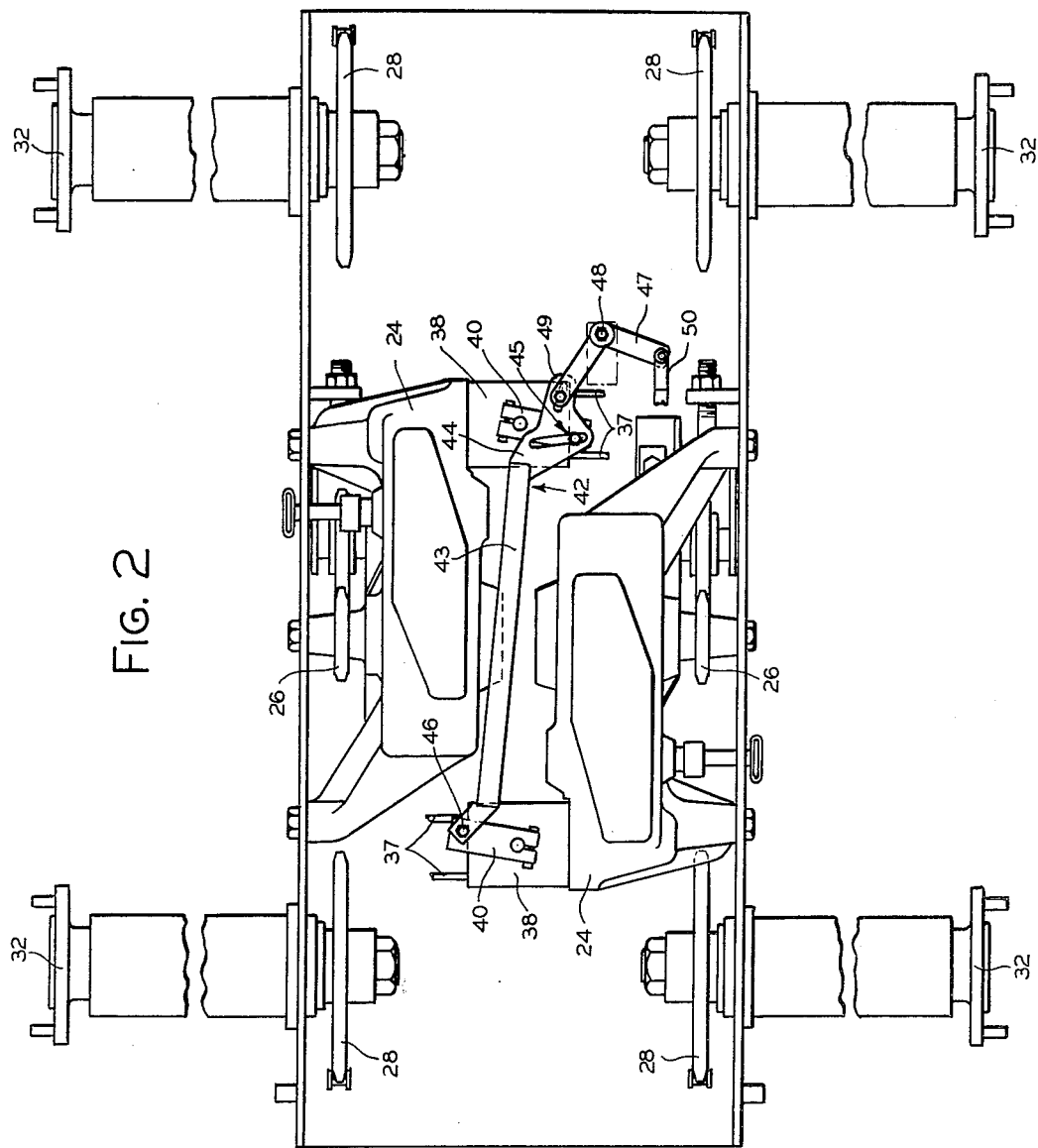
FIG. 2 is a partial horizontal sectional view through the transmission compartment of the loader body showing the gear cases and hydrostatic motors in an arrangement employing one form of two-speed control where the motor output shafts are on different axes.

In FIG. 2 each motor 38 will also have a rotating piston group and an inclinable swash plate which will have a fixed position in relationship to the swash plate of the pump (not shown) connected with the motor in a closed hydraulic loop by lines 37. The angle of the motor swash plate will depend on whether a high or low speed range is selected. The swash plate will be either fully displaced for low speed or displaced by a reduced amount for high speed as determined by limit stops in each position. Within these ranges there is the variation of speed as controlled by the angle of the pump swash plates determined by the steering levers 36. While details of the swash plate-type motor and pump units are not shown here, reference is made to FIG. 8 in the aforementioned U.S. Pat. No. 3,635,365 and the description in the specification of that patent commencing at column 4, lines 40–68 where a general description of this type of pump and motor operation may be found if necessary for a better understanding of this invention and to that extent, the description and drawing in this patent are incorporated herein by reference.

As the steering levers 36 are moved forward or back, output sprockets 26 of the gear cases 24 in the hydrostatic transmission units are caused to rotate in forward or reverse directions thus driving the wheel sprockets 28 of the stub axles 32 in either forward or reverse directions at the same or varying speeds on one side of the loader relative to those on the other side.

This operation is essentially common to both forms of two-speed motor controls disclosed herein and will be understood to apply to the second preferred embodiment discussed later as well as the first preferred embodiment, the detailed description of which continues below.

Figure 3:
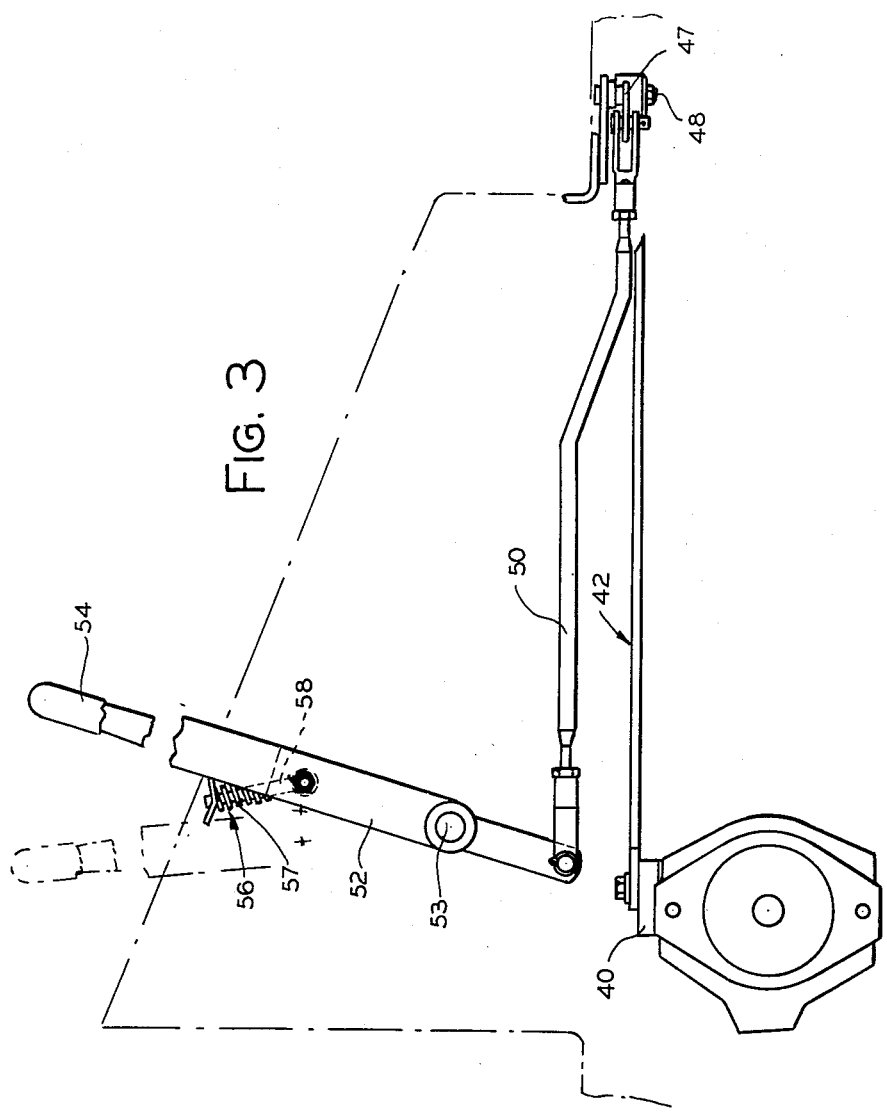
FIGS. 3 and 3a are partial fragmentary views showing other portions of the two-speed control for the transmission arrangement shown in FIG. 2.
Figure 3A:
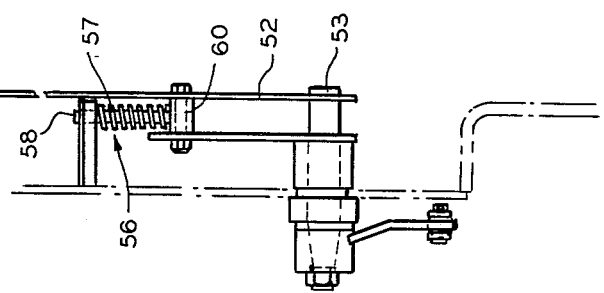

As shown in FIG. 2, the motors 38 are secured to the transmission casings 24 with their output shafts extending in opposite directions and on different axes. In this arrangement the swash plate control arms 40 extend horizontally in opposite directions. In accordance with a first form of the invention a shift lever 42 extends horizontally above the motors. It has an elongated body portion 43 and an enlarged flat end portion 44. The shift lever is connected between the swash plate control arms 40. There is a pivotal connection 46 with the swash plate control arm 40 of the one motor and a slide and guide connection 45, discussed more in detail below, at the opposite end with swash plate control arms 40 of the other motor. A bell crank 47 is pivotally mounted at 48 to the frame. On one end it is connected to a projection 49 of the shift lever and on the opposite end to a drag link 50 which in turn is connected at its opposite end to a manual selector handle 52 (FIG. 3) pivotally mounted at 53 on the upper body portion of the loader such that the upper end 54 of the handle is accessible to the operator. An over-center spring mechanism 56 includes a pivoted rod member 58 on a bushing 60 which carries a spring 57 such that when the handle 52 is moved to either position as in FIG. 3, the spring will act on a line offset relative to the pivot 53 when the handle passes its midpoint so as to bias the control linkage in either direction.

Figure 4:
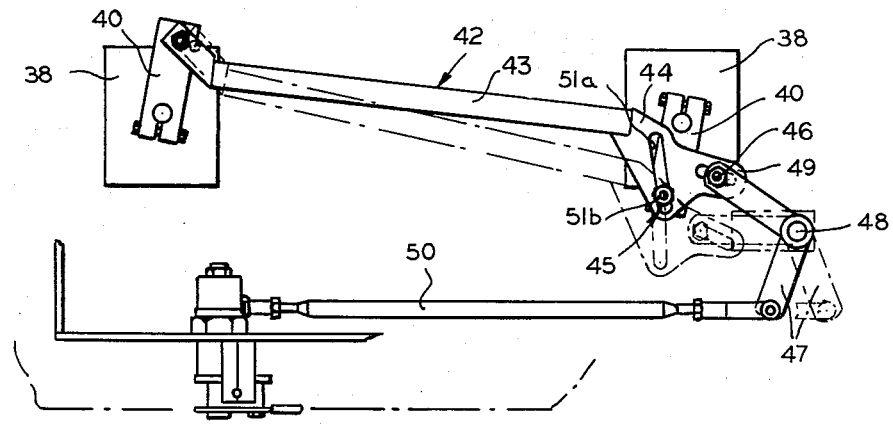
FIG. 4 is a partial view of the control shown in FIG. 2.

In FIG. 4 the shift lever is shown in the low range corresponding to an angle of the swash plates for full displacement of the pistons. When the drag link 50 is thrust rearwardly causing the bell crank 47 to rotate in a counterclockwise direction as viewed in FIG. 4, the shift lever is moved to the high range position corresponding to the angle of the swash plates of less than full displacement. A lost motion connection 46 with the extension 49 enables the shift lever to move laterally relative to the bell crank. The shift lever 42, will be shifted downwardly and laterally to the right as viewed in FIG. 4 in dotted lines. In the process, the slide and guide connection 45 with the one swash plate control arm 40 will move that arm to the left or clockwise in FIG. 4, and the swash plate to the reduced displacement position. Simultaneously the swash plate control arm 40 of the other motor moves to the right, also clockwise in FIG. 4, shifting the swash plate to its reduced displacement position. It should be noted, that the slide and guide connection 45 includes a slot 51a formed in the enlarged flat end portion of the shift lever 42 in which is received a pin or guide 51b connected to the swash plate control arm 40. The slot 51a is inclined laterally in a direction and by an amount which will bring about the required wedging action of the control linkage for holding the motor swash plates in either the low or high speed range. In practice, the angle of the slot 51a must be less than 90° relative to a base line taken through the control arm pivots at opposite ends of the shift lever in the high position as shown in dotted lines in FIG. 4, and preferably between 55° to 80°. Best results seem to be obtained if the angle is about 65° for then the wedging action is substantial but not so large as to make it difficult to shift.

It will be appreciated that in either the high or low speed range, the slide and guide connection 45 resists any tending to drift under the force exerted by the rotating piston groups of the motors which would otherwise occur because of the wedging action created by the slot 51a and guide 51b in combination with the over-center mechanism. Sufficient force is exerted by the spring 57, together with the wedging action, to overcome any such tendency. Also, enough overtravel is provided in the linkage to assure full motion of the swash plates in both directions. The wedging action of the linkage operates in both directions to assure that each swash plate comes against its stop and is held firmly.

B. Second or Alternate Preferred Embodiment

Figure 5:
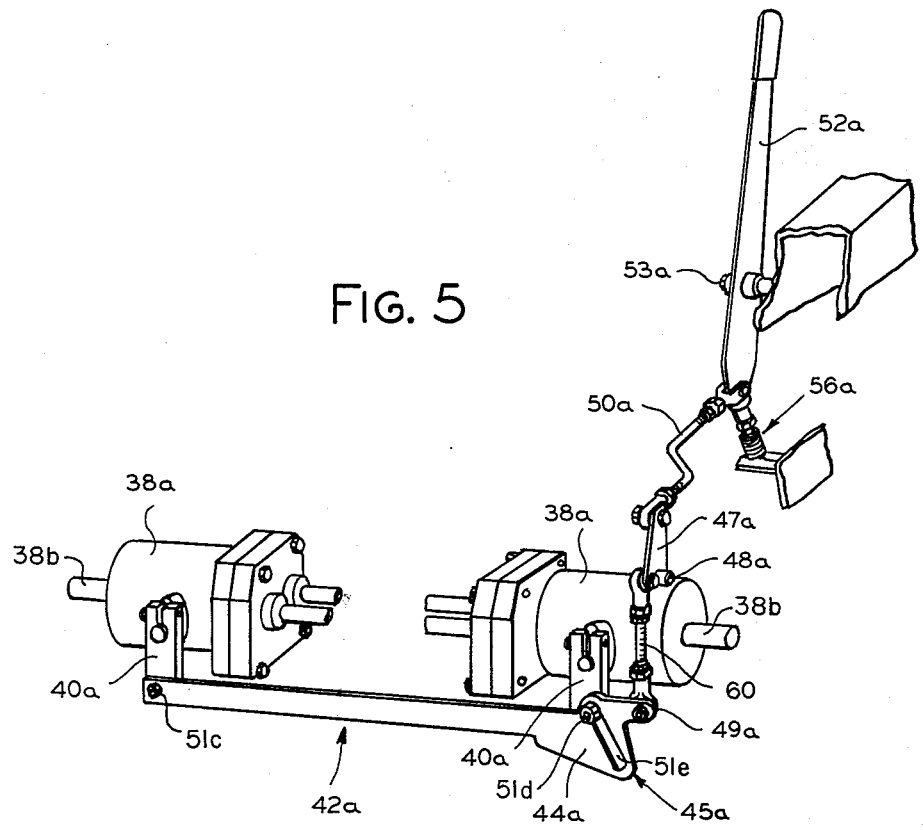
FIG. 5 is a view showing another form of two-speed control for a transmission arrangement where the motors have their output shafts on a common axis.

Referring now to FIG. 5, a second form of two-speed motor control is shown in which the motors 38a of the transmissions have their output shafts 38b aligned on a common axis. In this form, parts of the control similar to those identified with respect to the first embodiment will be identified by the same numerals although with a letter suffix. The motors 38a have swash plate control arms 40a which extend vertically downwardly generally in the same direction and are connected by a shift lever 42a (by pins 51c, 51d) in a manner similar to that previously described with the other form of the invention except the enlarged, flat end portion is in a vertical plane so that the slide and guide connection 45a may connect to the control arm 40a of the swash plate. A connecting rod 60 has a ball joint connection at its upper and lower ends with a bell crank 47a pivotally mounted in a vertical plane on a bracket attached to the motor and with the lever projection 44a at the lower end. A drag link 50a connects at one end to the bell crank 47a and at the opposite end to a control handle 52a which is pivotally mounted to the loader body at 53a and is being held by the over-center spring mechanism 56a in combination with the slide and guide 45a in either the high or low range positions as in the manner similar to the other form of the invention.

The operation of the control shown in FIG. 5 is similar to that previously described in that when the lever 52a is moved from the forward position, as shown, to the rear position the shift lever 42a is moved upwardly and laterally to the right rotating simultaneously both the swash plate control arms 40a to the right, in a manner as viewed in FIG. 5, so that they become locked in the full displacement or low speed range of the motors.

While only a single preferred embodiment of my invention has been disclosed, it will be understood that this description is for purposes of illustration only and that various modifications and changes can be made to my invention without departing from the spirit and scope of it. Therefore, the limits of my invention should be determined from the following appended claims.

I claim:

1. A two-speed control for dual hydrostatic motors spaced with the output shafts extending in opposite directions on different axes, each motor having a rotating piston group and a swash plate inclinable to a high or low speed position of piston displacement, said control comprising a shift lever interconnecting the swash plate of the motors operable in one direction to cause both swash plates to be shifted to one position and vice versa, a manual control lever movable between high and low speed positions, and a linkage connecting the manual control lever and shift lever operable upon movement of the manual control member to move the shift lever in one or the other of said positions corresponding to either the high or low speed positions of the swash plate, and wedging means acting to yieldably hold the shift lever in the position selected against the returning force acting on the swash plates by said piston groups, said linkage comprising a drag link, a bell crank pivoted horizontally, one end of the drag link being pivotally connected to said manual control member and the other to said bell crank, said shift lever extending horizontally and having a projection connected to the other end of the bell crank, such that longitudinal movement of the drag link causes rotation of the bell crank, which in conjunction with the slide and guide wedging motion, produces a longitudinal lateral shifting movement of said shift lever, and an over-center spring mechanism acting on said manual control member offset relative to its pivot axis so as to hold said member on either side of a midposition yet permitting the operator to move the control member between the low or high speed positions by overcoming the biasing force of the over-center spring mechanism.

* * * * *